ס3,833,533
Patented Sept. 3, 1974

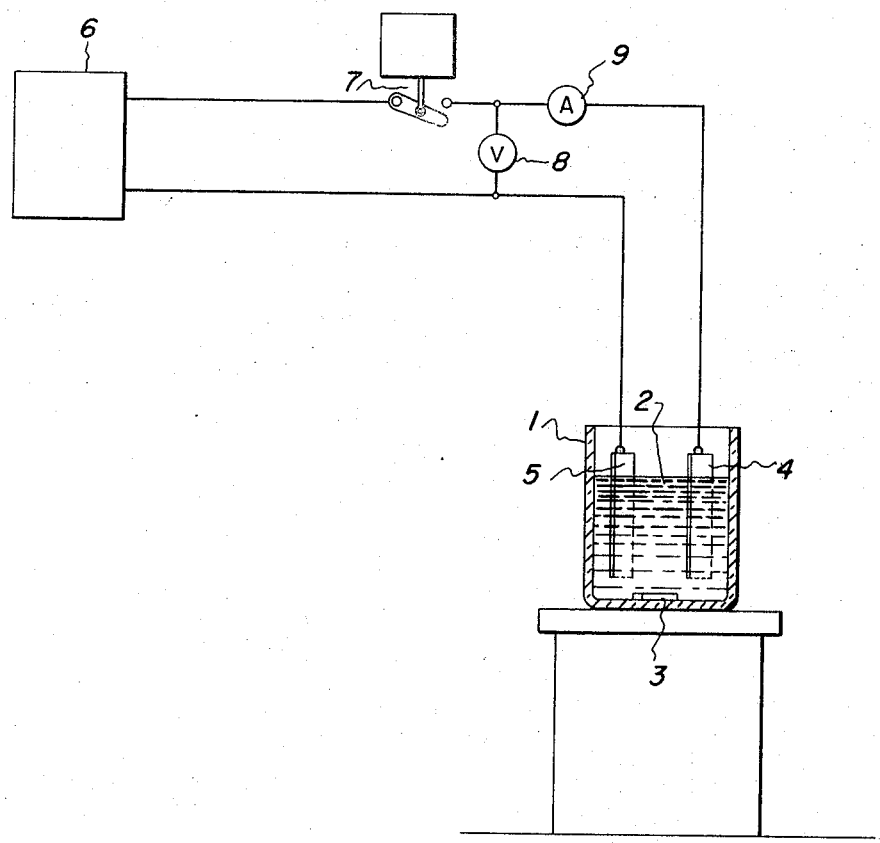

3,833,533
AQUEOUS ELECTROCOATING SOLUTION FROM POLYAMIDE-ACID RESIN
Fred F. Holub, Schenectady, and Richard F. Gaertner, Slingerlands, N.Y., assignors to General Electric Company
Original application May 27, 1970, Ser. No. 40,802, now abandoned. Divided and this application June 21, 1972, Ser. No. 264,949
Int. Cl. C08g 20/32, 51/24; C23b 13/00
U.S. Cl. 260—29.2 M                     5 Claims

ABSTRACT OF THE DISCLOSURE

Aqueous solutions of polyamide acids having chemically-combined divalent benzene carboxylic acid amide units of the formula

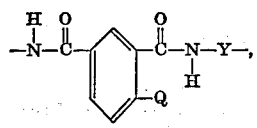

where Q is an ammonium or organic amine neutralized carboxy radical and Y is a divalent organo radical, can be electrocoated onto an electroconducting substrate to provide for polyamideimide films having valuable insulating characteristics.

---

This application is a division of our copending application Ser. No. 40,802, filed May 27, 1970, now abandoned, assigned to the same assignee as the present invention.

The present invention relates to aqueous electrocoating solutions and methods for preparing and using the same.

Aqueous electrocoating solutions of the present invention consist essentially of (A) a polyamide acid, (B) water, (C) organic solvent, and (D) a base selected from ammonia, organic amine and mixtures thereof, where (A) is a member selected from (a) a polyamide acid consisting essentially of chemically-combined divalent benzene carboxylic acid amide units of the formula (1) 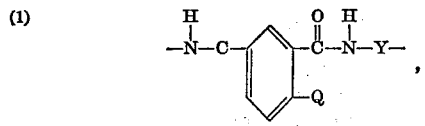

where Q is a base neutralized carboxy radical and Y is a diorgano radical defined below, and (b) a polyamide acid consisting essentially of
(i) from 10 to 99 mole percent of neutralized divalent benzene carboxylic amido units of the formula, (2) 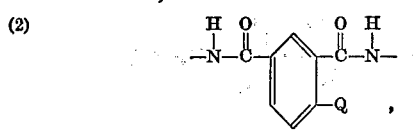

and
(ii) from 1 to 90 mole percent of unneutralized divalent benzene amido units selected from, (3) 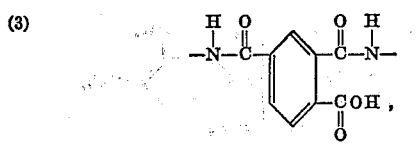

(4) 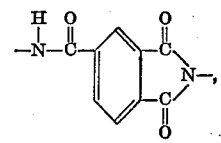

(5) 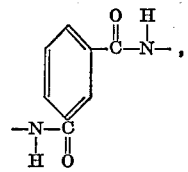

and mixtures consisting essentially of such units, where (i) and (ii) units are joined together through Y linkages wherein Y is a divalent organo radical selected from divalent hydrocarbon, radicals having from 1 to 15 carbon atoms,

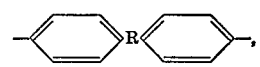

and

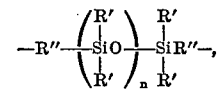

R is a divalent radical selected from the group consisting of

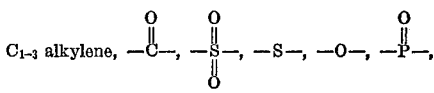

R' is selected from monovalent hydrocarbon radicals, halogenated monovalent hydrocarbon radicals and cyanoalkyl radicals, R" is selected from divalent hydrocarbon radicals, and n is an integer equal to 1 to 25 inclusive.

Radicals included by Y are, for example, $C_{2-8}$ alkylene radicals, such as ethylene, trimethylene, tetramethylene, pentamethylene, etc.,

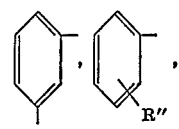

such as where R" is $C_{2-8}$ alkylene as defined above. Radicals included by R' are, for example, aryl radicals such as phenyl, tolyl, xylyl, naphthyl; haloaryl radicals such as chlorophenyl, fluorotolyl, etc.; alkyl radicals such as methyl, ethyl, propyl, butyl, pentyl, hexyl, etc.; alkenyl radicals such as vinyl, aryl, haloalkyl radicals such as trifluoropropyl, tetrafluorobutyl, etc. Radicals included by R" are, for example, alkylene radicals such as ethylene, propylene, butylene, etc.; arylene radicals such as phenylene, xylene, tolylene, etc. Where R' and R" respectively can represent more than one radical, these radicals can be all the same, or any two or more of the aforementioned radicals.

The polyamide acids employed in the practice of the invention can be made by effecting reaction in a suitable organic solvent between substantially equal molar amounts of an organic diamine of the formula, (6)  $NH_2YNH_2$, where Y is as previously defined, and a benzene carboxylic acid reactant selected from a 4-haloformylphthalic anhydride, such as 4-chloroformylphthalic anhydride, or a mixture of such 4-haloformylphthalic anhydride and a bis-phthalolylhalide, such as isophthalolyl chloride. Minor amounts of other bis-phthalolylhalides such as terephthalolyl halides, orthophthalolyl halides, etc., also can be tolerated such as up to about 10 mole percent of the total moles of benzene carboxylic acid reactant, without substantially altering the desirable solubility characteristics of the resulting polyamide acid.

Reaction between the carboxylic acid reactant and the organic diamine can be effected conveniently by mixing substantially equal molar amounts of the organic diamine and the carboxylic acid reactant in the organic solvent, while maintaining the temperature at about 40° C. or below by using external cooling. To facilitate the formation of the polyamide acid, an effective amount based on the weight of mixture of a catalyst such as pyridine, etc., also can be employed while the mixture is stirred over a period of about an hour or more, preferably two to three hours. Upon completion of the reaction, the resulting organic solvent solution of polyamide acid can be poured into excess water to precipitate the polymer and to provide for the removal of hydrogen halide formed during the reaction. The polyamide acid can be recovered from the resulting mixture.

In preparing the aqueous electrocoating solutions of the present invention, the order of addition of this various ingredients can be varied. Such factors as the mole percent of the formula (3) units in the polyamide acid, the type of organic solvent, the ratio of organic solvent to water, amount of base can vary widely.

Experience has shown that in most instances, a solution of the polyamide acid can be formed initially in the organic solvent to which the base can be added in an amount sufficient to provide for at least about 10 mole percent of neutralized units of formula (1). Water can then be added to the resulting organic solvent solution of the polyamide acid to produce a substantially uniform electrocoating solution.

Depending upon such factors as whether the polyamide acid consists essentially of units of formula (1), or whether it contains as little as 10 mole percent of such units and 90 mole percent of units of formulas (3)–(5), the ratio of water to organic solvent can vary widely to produce the aqueous electrocoating solutions.

It has been found that electrocoating solutions can be formed with polyamide acids having at least about 10 mole percent of chemically-combined units of formula (1), when utilized in combination with organic solvent and water to provide for a solution having from about 1 percent to 20 percent solids. Higher amounts of water can effect the agglomeration of polyamide acid resulting in a nonuniform mixture.

Neutralization of the polyamide acid in the organic solvent generally can be employed prior to the addition of water. However, limited amount of water can be added prior to the addition of base depending upon the organic solvent. For example, when employing phenol as the organic solvent, it is preferred to employ between 10 to 20 percent by weight of water prior to the addition of base, which can include, for example, ammonia, N-methyl morpholine, pyridine, dimethylethanolamine, N,N,N',N'-tetramethylbutanediamine, etc.

The amount of base which can be employed will depend upon such factors as the available carboxy radicals present in the polyamide acid, the degree of neutralization of such carboxy radicals desired, the strength and solubility of the base utilized, etc.

Experience has shown that effective electrocoating results can be achieved with the polyamide acid, if at least 10 mole percent of the total chemically-combined benzene carboxylic amide units of the polyamide acid, as shown by formulas (2)–(4), are base neutralized units of formula (1).

In order to determine the mole percent of formula (3), units in the polyamide acid which can be converted to formula (1) units upon addition of base, the carboxy equivalent weight, per weight of sample can be determined by potentiometric titration prior to adding the base. For example, if the polyamide acid is made by effecting reaction between substantially equal molar amounts of 4,4-diaminodiphenylmethane, and 4-chloroformylphthalic anhydride to produce a polymer consisting essentially of chemically-combined units of the formula,

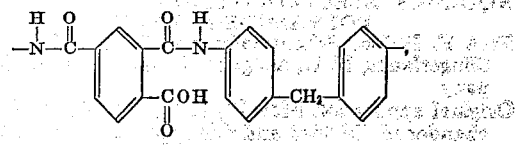

the theoretical gram equivalent of carboxy in the polyamide acid would be one gram mole of carboxy for each 372 grams of polymer. In most instances, however, at least a small amount of imidization can occur to produce units of formula (4).

Some of the organic diamines of formula (6) which are suitable for making the polyamide acid of the present invention are, for example, meta-phenylenediamine;
p-phenylenediamine;
4,4'-diaminodiphenylpropane;
4,4'-diaminodiphenylmethane; benzidine;
4,4'-diaminodiphenylsulfide;
4,4'-diaminodiphenylsulfone;
3,3'-diaminodiphenylsulfone;
4,4'-diaminodiphenyl ether;
2,6-diaminopyridine;
bis(4-aminophenyl)phosphineoxide;
bis(4-aminophenyl)-N-methylamine;
1,5-diaminonaphthalene;
3,3'-dimethyl-4,4'-diaminobiphenyl;
3,3'-dimethoxybenzidine;
2,4-bis(β-amino-t-butyl)toluene;
bis-(p-β-amino-t-butylphenyl) ether;
p-bis(2-methyl-4-aminopentyl)benzene;
p-bis(1,1-dimethyl-5-aminopentyl)benzene;
m-xylylenediamine; p-xylylenediamine;
bis(p-aminocyclohexyl)methane;
ethylenediamine; propylenediamine;
hexamethylenediamine; heptamethylenediamine;
octamethylenediamine; nonamethylenediamine;
decamethylenediamine;
3-methylheptamethylenediamine;
4,4-dimethylheptamethylenediamine;
2,11-diaminododecane;
1,2-bis(3-aminopropoxy)ethane;
2,2-dimethylpropylenediamine;
3-methoxyhexamethylenediamine;
2,5-dimethylhexamethylenediamine;
2,5-dimethylheptamethylenediamine;
5-methylnonamethylenediamine;
1,4-diaminocyclohexane;
1,12-diaminooctadecane;

etc., and mixtures thereof. In addition, the organic diamines can include diaminosiloxanes such as,

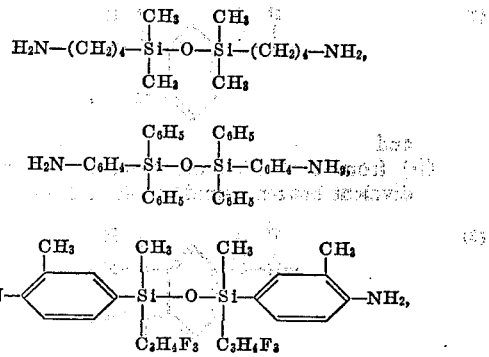

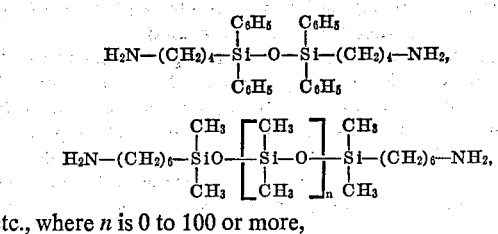

etc., where $n$ is 0 to 100 or more,

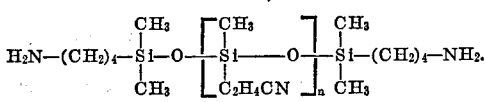

Suitable organic solvents which can be employed in combination with the organic diamines and the above-described 4-haloformylphthalic anhydride or a mixture with an isophthaloylhalide include, for example, N-methyl-2-pyrrolidone, the normally liquid organic solvents of the N,N-dimethylmethoxyacetamide, N-methylcaprolactam, etc. and tetramethylene urea, pyridine, hexamethylphosphoramide, formamide, N - methylformamide, butyrolactone, N - acetyl - 2 - pyrrolidone, phenol, etc. The solvents can be used alone, as mixtures or in com- in the form of electrical conductors, electrical components, etc.

The electrocoating compositions of the present invention can be employed to make polyamideimide films exhibiting superior insulating characteristics. These films can be employed as protective coatings on various metallic substrates such as copper, aluminum, zinc, iron, etc., in the form of electrical conductors, electrical components, etc.

EXAMPLE 1

An electrocoating solution was prepared by slowly dissolving 5 parts of a polyamide amide acid having chemically-combined units of the formula,

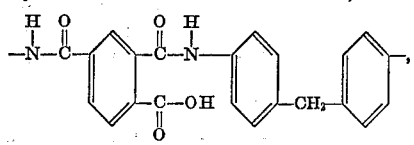

in a solvent mixture of 40 parts of distilled phenol and 5 parts of distilled water. Potentiometric titration in accordance with the procedure described in Cundiff and Markunas, Anal. Chem., 30, 1447, 1450 (1958) showed that the polyamide acid had an average of approximately $1.66 \times 10^{-3}$ equiv. COOH/g. polymer indicating that it had about 50 mole percent of formula (3) radicals and 50 mole percent of formula (4) radicals. There was then added to the resulting solution 0.25 parts of concentrated ammonium hydroxide. The resulting polyamide amide acid solution had approximately 50 percent of its available carboxy radicals neutralized after the addition of the ammonia hydroxide.

As shown by the attached drawing, an apparatus was employed to electrocoat a metal substrate, where 1 is a glass electrocoating vessel containing the solution 2 to be electrocoated, supplied with a stirrer 3 for agitation. The cathode 4 in each instance was a flat copper plate 2" x 1" x 1/16" placed 4½ centimeters from the metallic surface to be coated which was used as an anode 5. A constant DC voltage source at 6 was employed in combination with a built-in timer 7, and appropriate instrumentation 8 and 9. The power was turned on before immersing the surface to be coated into the coating bath. It was found that the significant anodic deposits (0.25 to 0.7 mil cured film thickness) were obtained over relatively short periods of deposition (15 seconds).

Table I shows the results obtained with respect to the substrate utilized as the anode, the applied voltage, coating time and cured coating thickness after the film was cured for 3½ minutes at 250° C. All the films shown in Table I were found to be adherent and flexible.

TABLE I

| Substrate | Voltage | Coating time (sec.) | Cur time at 250° C. (min.) | Coating thickness (mils) |
|---|---|---|---|---|
| Copper | 20 | 15 | 3.5 | 0.15 |
| Do | 60 | 15 | 3.5 | 0.3 |
| Nickel | 20 | 15 | 3.5 | 0.2 |
| Cold rolled steel | 30 | 15 | 3.5 | 0.2 |
| Aluminum | 30 | 15 | 3.5 | 0.2 |
| Do | 60 | 15 | 3.5 | 0.25 |

The above procedure was repeated using the same polyamide acid at about 10 percent by weight solids in phenol-water-ammonia mixtures, having phenol to water ratios of 5 to 1 and base neutralization of about 83 percent of available carboxy and 100 percent of available carboxy respectively. It was found that the films obtained also were flexible and adherent and exhibited valuable insulating characteristics. They were flexible, adherent and pinhole free.

EXAMPLE 2

In accordance with the procedure of Example 1, 10 parts of the polyamide acid were dissolved in 75 parts of N-mehtyl-2-pyrrolidone. To the resulting solution there was then added 0.5 parts of concentrated ammonium hydrixode and 15 parts of distilled water. Based on method of preparation, there was obtained a solution of the polyamide acid having about 50 percent of its available carboxy radicals neutralized with ammonium hydroxide. The mixture was then electrocoated in accordance with the procedure of Example 1, using successively copper and aluminum substrates as the anode. Table II shows the results obtained:

TABLE II

| Substrate | Voltage | Coating time (sec.) | Cure time at 250° C. (min.) | Coating thickness (mils) |
|---|---|---|---|---|
| Copper | 15 | 15 | 3.5 | 0.25 |
| Do | 30 | 15 | 3.5 | 0.7 |
| Aluminum | 30 | 15 | 3.5 | 0.25 |

Extremely smooth and glossy films were obtained exhibiting valuable insulating properties. Another solution was prepared with the above mixture utilizing an amount of ammonium hydroxide in excess of that required to fully neutralize all available carboxy radicals of the polyamide amide acid. It was found that the surface of the films were rougher than those prepared at 50 percent neutralization.

EXAMPLE 3

Electrocoating solutions were made using the polyamide of Example 1, with N-methyl-2-pyrrolidone, and N,N-dimethylacetamide as the solvents respectively, and N-methylmorpholine as the base. Table III shows the percent solids, solvent to water ratios and approximate degree of neutralization of the available carboxy radicals on the polyamide acid in the respective mixtures, where NMP is N-methyl - 2 - pyrrolidone and DMA is N,N-dimethylacetamide.

TABLE III

| | Solvent | Water | Solids, percent | Neutralization, percent |
|---|---|---|---|---|
| NMP | 5 | 1 | 10 | 60 |
| DMA | 40 | 1 | 20 | 50 |
| DMA | 6 | 1 | 18 | 70 |

The above mixtures were electrocoated using voltages between 10–60 volts and coating times between 15 to 60 seconds where the thicknesses of the cured films obtained varied between 0.6 to 1.4 mils. All of the films were cured as in Example 1, and were found to exhibit valuable insulating properties.

EXAMPLE 4

An electrocoating solution was prepared utilizing the polyamide acid of Example 1, in an amount sufficient to provide for about 10 percent solids in an N-methyl-2-pyrrolidone water solvent mixture employing a 6-to-1 ratio by weight of organic solvent to water. After the polymer dissolved, pyridine was added to the mixture in an amount to provide for 50 percent neutralization of the available carboxy.

The solution was electrocoated as in Example 1. Table IV shows the results obtained:

TABLE IV

| Substrate | Voltage | Coating time (sec.) | Cure time at 250° C. (min.) | Coating thickness (mils.) |
|---|---|---|---|---|
| Copper | 30 | 15 | 3.5 | 0.05 |
| Do | 60 | 15 | 3.5 | 0.15 |
| Do | 90 | 15 | 3.5 | 0.4 |

The films obtained were flexible and adherent and exhibited valuable insulating characteristics.

EXAMPLE 5

A polyamide acid was made by mixing in 160 parts of N-methyl-2-pyrrolidone, 19.8 parts of 4,4'-diaminodiphenyl methane and 20.51 parts of a carboxylic acid reactant consisting of a mixture of 80 mole percent of isophthaloyl chloride and 20 mole percent of 4-chloroformylphthalic anhydride. There also was utilized in the mixture about 1 part of pyridine. The temperature of the mixture was maintained below 40° C. by the use of external cooling, while it was stirred for about 3 hours. The mixture was then poured into a large excess of water containing about 2 parts of formic acid effecting the precipitation of a polyamide acid in the form of a white solid. The product was filtered and dried at room temperature under vacuo.

There was added about 2 parts of a 1 N ammonium hydroxide to a solution of 3.34 parts of the above polyamide acid and 38.36 parts of N-methyl-2-pyrrolidone. There was then added dropwise 4 parts of water to produce a polyamide acid solution. Based on method of preparation, the solution consisted essentially of a polyamide acid having about 20 mole percent of ammonium hydroxide neutralized units of the formula,

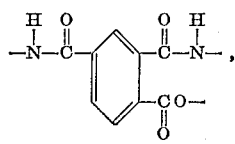

and 80 mole percent of units of the formula,

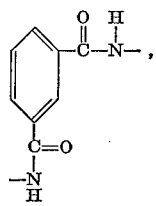

chemically combined with divalent radicals of the formula,

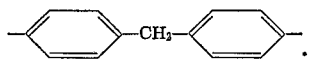

In accordance with the method of Example 1, the solution was employed to electrocoat a copper substrate. The cured film was tested in salt water under an applied EMF and found to be bubble free which indicated it was free of pin-holes.

EXAMPLE 6

A polyamide acid is prepared in accordance with the procedure of Example 5, utilizing 15.7 parts of an organo diamine reactant in the form of a mixture consisting of equal molar amounts of 4,4'-diaminodiphenylmethane and 1,6-hexamethylenediamine, 20.51 parts of the benzene carboxylic acid reactant of Example 5, in 145 parts of N-methyl-2-pyrrolidone. A polyamide acid free of hydrogen halide is recovered as a white solid.

A solution is prepared by utilizing 2.99 parts of the above polyamide acid, 57 parts of N-methyl-2-pyrrolidone, about 2 parts of a 1 N ammoniumhydroxide solution and 4 parts of water. Based on method of preparation, the solution consists essentially of a polyamide acid having the same mole percent of benzene carboxylic acid units chemically-combined with diorgano radicals selected from

The solution is employed to electrocoat a copper substrate in accordance with the procedure of Example 1. A polyamideimide film is obtained having valuable insulating characteristics after the film was cured for 3 minutes at 250° C.

EXAMPLE 7

A polyamide acid is prepared in accordance with the procedure of Example 5, utilizing 21.36 parts of an organodiamine reactant in the form of a mixture of 15.84 parts of 4,4'-diaminodiphenylmethane and 5.25 parts of bis-1,3-(4-aminobutyl)-1,1,3,3-tetramethyldisiloxane, and 20.51 parts of a benzene carboxylic acid reactant consisting of a mixture of 80 mole percent of isophthaloyl chloride and 20 mole percent of 4-chloroformylphthalic anhydride in 187 parts of N-methyl-2-pyrrolidone. The mixture was stirred for 3 hours while maintaining the temperature below 40° C. It was then poured into a large excess of water. A polyamide acid was recovered as a white solid.

An electrocoating solution is prepared utilizing 3.25 parts of the above polyamide acid, 40.5 parts of N-methyl-2-pyrrolidone, 2 parts of a 1 N ammonium hydroxide solution and 4 parts of water. In accordance with the method of Example 1, the mixture is employed to electrocoat an aluminum substrate. The aluminum substrate is then heated at 250° C. for about 5 minutes. A polyamideimide film is obtained exhibiting valuable insulating characteristics.

EXAMPLE 8

A polyamide acid was prepared in accordance with the method of Example 5, except that pyridine was omitted and precipitation of the polyamide acid was effected in methanol instead of water. In preparing the polyamide acid, there was utilized 19.8 parts of 4,4'-diaminodiphenylmethane and 20.3 parts of a carboxylic acid reactant consisting of 90 mole percent of isophthaloyl chloride and 10 mole percent of 4-chloroformylphthalic anhydride and 160 parts of N-methyl-2-pyrrolidone. A white hydrogen halide-free solid was recovered. Based on method of preparation, the product was a polyamide acid having about 10 mole percent of chemically-combined units of the formula (3).

An electrocoating solution was prepared employing 3.31 parts of the above polyamide acid, 69 parts of N-methyl-2-pyrrolidone, 1.0 part of 1 N ammonium hydroxide and 4.34 parts of water. A copper substrate was electrocoated in accordance with the method of Example 1. The copper substrate was then heated for 10 minutes at 250° C. to produce a polyamideimide copper composite in which the polyamideimide was in the form of a thin film which exhibited valuable insulating characteristics. It had a cut-through temperature of 340° C. in accordance with the procedure of Precopio et al. pat. 2,936,296.

Although the above examples show only a few of the very many polyamide acids and electrocoating mixtures derived therefrom and methods for making these materials, it should be understood that the present invention is directed to a much broader class of polyamide acids having chemically-combined units of formula (1). These polyamide acids can be electrocoated on a variety of substrates from electrocoating solutions.

What is claimed is:

1. Aqueous electrocoating solutions which consist essentially of (A) a polyamide acid, (B) water, (C) organic solvent, and (D) a base selected from ammonia, organic amine and mixtures thereof, where (A) is a member selected from
   (a) a polyamide acid consisting essentially of chemically-combined divalent benzene carboxylic acid amide units of the formula

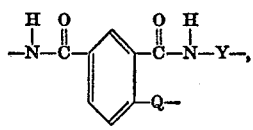

where Q is a base neutralized carboxy radical and Y is a diorgano radical defined below, and
   (b) a polyamide acid consisting essentially of
      (i) from 5 to 99 mole percent of neutralized divalent benzene carboxylic amido units of the formula,

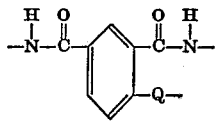

and
      (ii) from 1 to 95 mole percent of unneutralized divalent benzene amido units selected from,

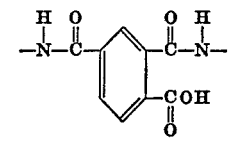

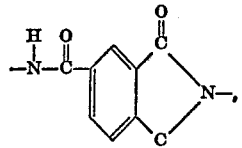

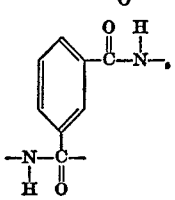

and mixtures consisting essentially of such units, where (i) and (ii) units are joined together through Y linkages wherein Y is a divalent organo radical selected from divalent hydrocarbon radicals having from 1 to 15 carbon atoms,

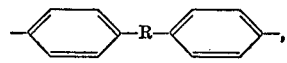

and

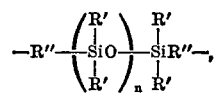

R is a divalent radical selected from the group consisting of

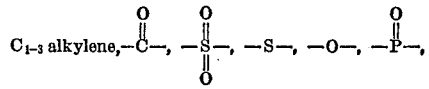

R' is selected from monovalent hydrocarbon radicals, halogenated monovalent hydrocarbon radicals and cyanoalkyl radicals, R'' is selected from divalent hydrocarbon radicals, and $n$ is an integer equal to 1 to 25 inclusive.

2. A solution in accordance with claim 1, where the organic solvent is N-2 methypyrrolidone.
3. A solution in accordance with claim 1, where the organic solvent is N,N-dimethylacetamide.
4. A solution in accordance with claim 1, where the organic solvent is phenol.
5. A solution in accordance with claim 1, where the base is ammonia.

References Cited

UNITED STATES PATENTS

| | | | |
|---|---|---|---|
| 3,528,937 | 8/1970 | Reynolds et al. | 260—29.2 N |
| 3,533,998 | 10/1970 | Yolles | 260—29.2 N |
| 3,546,152 | 12/1970 | Bolton | 260—29.2 N |
| 3,573,260 | 3/1971 | Morello | 260—29.2 N |
| 3,663,728 | 5/1972 | Hoback et al. | 260—29.2 N |
| 3,673,155 | 6/1972 | Holub et al. | 260—78 TF |
| 3,689,464 | 6/1972 | Holub et al. | 260—78 TF |

MURRAY TILLMAN, Primary Examiner

A. H. KOECKERT, Assistant Examiner

U.S. Cl. X.R.

204—181; 260—29.2 N, 46.5 E